(12) United States Patent
Rijpkema

(10) Patent No.: US 10,286,856 B2
(45) Date of Patent: May 14, 2019

(54) COMPOSITE FIBER MAT FOR PRODUCING A SUPPORT PLATE FOR A MOTOR VEHICLE COMPONENT AND METHOD FOR MANUFACTURING THE SAME

(71) Applicant: International Automotive Components Group GmbH, Dusseldorf (DE)

(72) Inventor: Henk Rijpkema, Baarlo (NL)

(73) Assignee: International Automotive Components Group, GmbH, Dusseldorf (DE)

( * ) Notice: Subject to any disclaimer, the term of this patent is extended or adjusted under 35 U.S.C. 154(b) by 0 days.

(21) Appl. No.: 15/151,305

(22) Filed: May 10, 2016

(65) Prior Publication Data

US 2016/0332340 A1    Nov. 17, 2016

(30) Foreign Application Priority Data

May 11, 2015    (DE) .................. 10 2015 107 338

(51) Int. Cl.

| | |
|---|---|
| *B29C 43/02* | (2006.01) |
| *D05B 17/00* | (2006.01) |
| *B62D 29/04* | (2006.01) |
| *D04H 1/54* | (2012.01) |
| *B60R 13/02* | (2006.01) |
| *B60R 13/08* | (2006.01) |
| *B29C 43/52* | (2006.01) |
| *D04H 1/00* | (2006.01) |

(Continued)

(52) U.S. Cl.
CPC ............. *B60R 13/08* (2013.01); *B29C 43/18* (2013.01); *B29C 43/52* (2013.01); *B29C 70/00* (2013.01); *B60R 13/02* (2013.01); *D04H 1/52* (2013.01); *D04H 1/558* (2013.01); *B29K 2105/08* (2013.01); *B29K 2221/003* (2013.01); *B29K 2995/0005* (2013.01); *B29L 2031/30* (2013.01); *D05B 17/00* (2013.01)

(58) Field of Classification Search
CPC ......... B60R 13/08; B60R 13/02; B29C 70/00; B29C 43/18; B29C 43/52; D04H 1/558; D04H 1/52; B29K 2105/08; B29K 2995/0005; B29K 2221/003; B29L 2031/30; D05B 17/00

See application file for complete search history.

(56) References Cited

U.S. PATENT DOCUMENTS 4,256,790 A * 3/1981 Lackman .............. B29C 66/112
                                                  428/73
5,429,853 A * 7/1995 Darrieux ................. B29C 70/24
                                                  112/440

(Continued)

FOREIGN PATENT DOCUMENTS

| | | |
|---|---|---|
| DE | 196 08 127 A1 | 9/1997 |
| DE | 101 56 875 A1 | 5/2003 |

(Continued)

*Primary Examiner* — David Sample
*Assistant Examiner* — Donald M Flores, Jr.
(74) *Attorney, Agent, or Firm* — Grossman, Tucker, Perreault & Pfleger, PLLC

(57) ABSTRACT

This disclosure pertains to a composite fiber mat for producing a support plate for a motor vehicle component, wherein at least a first subarea of the composite fiber mat is provided with at least one reinforcing seam.

14 Claims, 4 Drawing Sheets

(51) Int. Cl.
  *D04H 1/52*   (2006.01)
  *D04H 1/558*  (2012.01)
  *B29C 43/18*  (2006.01)
  *B29C 70/00*  (2006.01)
  B29K 105/08   (2006.01)
  B29K 221/00   (2006.01)
  B29L 31/30    (2006.01)

(56) References Cited

U.S. PATENT DOCUMENTS

| | | | |
|---|---|---|---|
| 5,891,541 A * | 4/1999 | Wynne | B29C 66/1122 |
| | | | 428/57 |
| 2002/0096506 A1 * | 7/2002 | Moreland | B64D 15/12 |
| | | | 219/202 |
| 2003/0021947 A1 * | 1/2003 | Tsiarkezos | B32B 7/08 |
| | | | 428/102 |
| 2004/0192142 A1 * | 9/2004 | Zafiroglu | B32B 5/08 |
| | | | 442/352 |

FOREIGN PATENT DOCUMENTS

| | | |
|---|---|---|
| DE | 100 05 202 B4 | 3/2007 |
| DE | 10 2010 041179 A1 | 3/2012 |
| DE | 10 2012 021738 A1 | 4/2014 |
| DE | 10 2012 221 404 A1 | 6/2014 |
| DE | 10 2013 200 288 A1 | 7/2014 |
| DE | 10 2013 102 489 A1 | 9/2014 |
| DE | 10 2014 216 021 A1 | 2/2016 |
| EP | 2 246 180 A1 | 11/2010 |

* cited by examiner

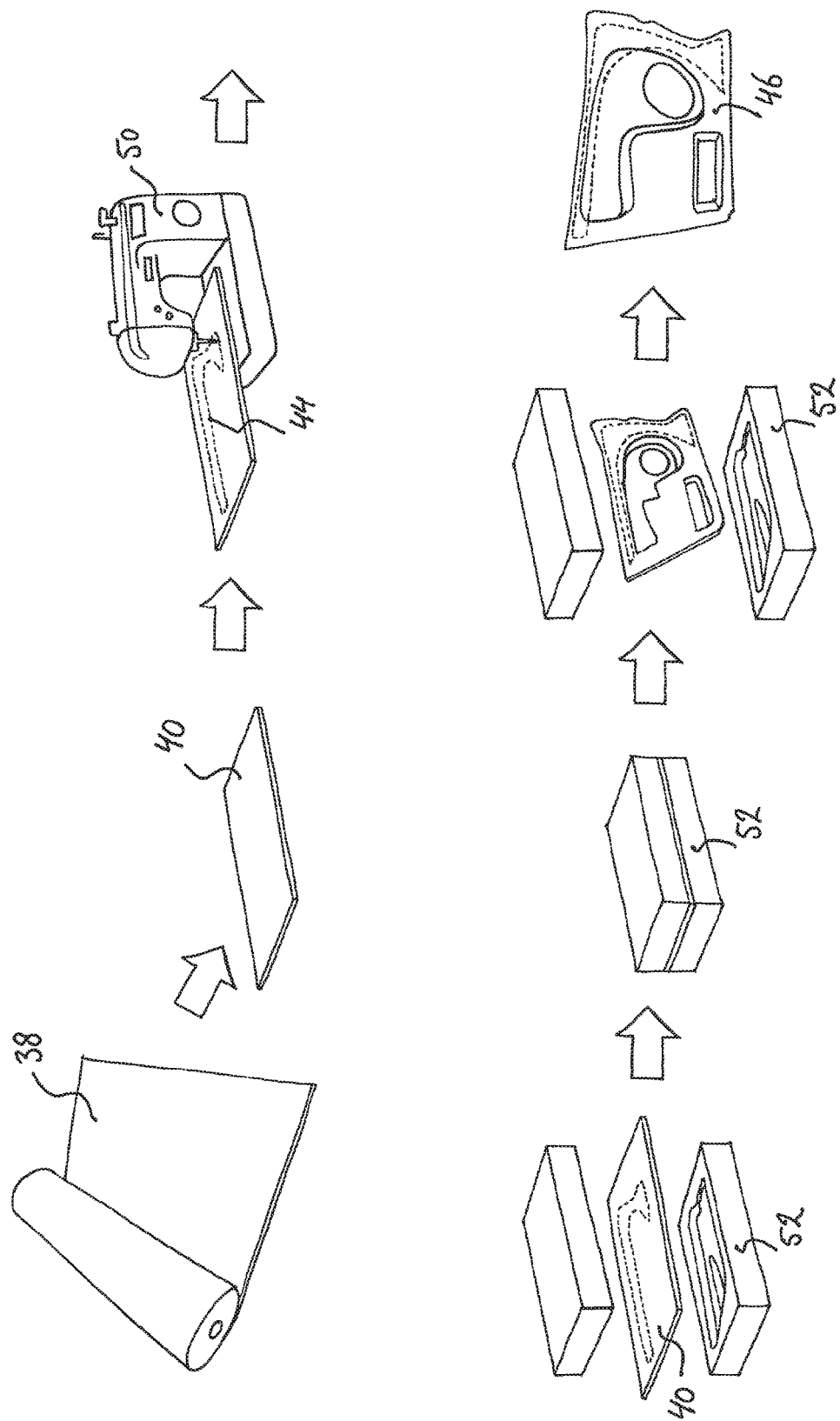

COMPOSITE FIBER MAT FOR PRODUCING A SUPPORT PLATE FOR A MOTOR VEHICLE COMPONENT AND METHOD FOR MANUFACTURING THE SAME

FIELD

This disclosure relates to a composite fiber mat for producing a support plate for a motor vehicle component and to a method for manufacturing a support component for a motor vehicle.

BACKGROUND

Composite fiber materials and, in particular, composite fiber mats are becoming more and more popular as starting materials for support components in motor vehicles. A composite fiber material generally consists of two main components, namely an embedding matrix and reinforcing fibers, wherein the interaction between these two components makes it possible to achieve properties that are superior to those of other composite materials, for example with respect to stability and low weight. The matrix of the composite fiber mat largely determines the appearance of the composite fiber mat and mechanically holds in position the reinforcing fibers, as well as transmits and distributes tensions between the fibers. The matrix may further protect the fibers from external mechanical and chemical influences. The fibers provide the composite fiber mat with the required strength. They absorb mechanical stresses and provide the material with tensile strength, compressive strength and bending strength.

The composite fiber material may be compressed and formed in a pressing tool in a preheated state in order to produce a preform or semifinished product that can be processed into a support plate of a motor vehicle component in further processing steps. These further processing steps may include, for example, laminating a cover layer on the component, forming the component to its final three-dimensional shape and integrally attaching other components.

Preforms of multilayer fiber mats as described, for example, in DE 10 2010 041 179 A1, DE 10 2012 021 738 A1 and EP 2 246 180 A2. The composite fiber mats described in these documents are produced of several layers that are bonded or sewn together.

In motor vehicle components, locally different stresses occur in different regions of the components during their production and use. During the production of the components, the occurring tensile and bending stresses may be higher in certain locally limited regions than in other regions due to the three-dimensional shaping of the support plate. Locally different stresses can also occur during the use of the component. On an interior door panel, for example, the region of the door handle or the region of the map pocket is subjected to higher tensile forces than other regions. On a cargo floor, higher stresses can be expected to occur in the central, well accessible region than on the edges. In case of a collision, the probability of a high compressive point load is also higher in certain regions of the motor vehicle component than in other regions, for example in the region of the dashboard compared to the front passenger seat or certain parts of the car body.

It may therefore be desirable to locally reinforce support components of the motor vehicle without increasing the overall weight of the motor vehicle component or at least without thereby increasing the weight more than necessary.

SUMMARY

A composite fiber mat for producing a support plate for a motor vehicle component may be provided with at least one reinforcing seam in a subarea thereof. The composite fiber mat does not have a reinforcing seam in other parts of the composite fiber mat outside this subarea. The composite fiber mat is locally reinforced due to the at least one reinforcing seam. The reinforcing seam may be produced at locations, at which the composite fiber mat is subjected to particularly high stresses during its processing and/or during the use of the vehicle component manufactured therefrom, for example, due to the application of tensile forces, compressive forces and bending stresses.

It was determined that a reinforcement of the composite fiber mat can be achieved by simply producing the reinforcing seam, i.e. without respectively having to apply or incorporate additional material layers or other reinforcing elements onto or into the composite fiber mat in the region to be reinforced. The strength of the composite fiber mat can be locally increased and its overall stability can therefore be improved by simply producing the seam.

The reinforcing seam may be produced in such a way that it borders, fills and/or traverses the subarea to be reinforced once or several times. The reinforcing seam may be produced, for example, in the form of one or more loops, circles or other closed ring-like shapes, in the form of polygons such as closed or open rectangles, e.g. in a U-shaped fashion, in the form of a star, in the form of a sinuous line or zigzag line or in the form of a combination of these shapes. In this case, the reinforcing seam can be aligned on the composite fiber mat in such a way that it optimally absorbs and/or distributes the tensile, compressive and bending stresses to be expected during the processing or the use of the support plate, that it allows a deformation of the composite fiber mat at locations, at which the deformation is permissible, and that it counteracts a deformation at locations, at which such a deformation should not take place. Upon a side impact on a vehicle door, for example, the reinforcing seam makes it possible to homogenously distribute forces over a large surface.

The reinforcing seam can penetrate the composite fiber mat from its upper surface to its bottom surface. If the composite fiber mat is composed of several mat layers, the reinforcing seam may be provided in only one of these mat layers, in several mat layers or in all mat layers. The reinforcing seams in different mat layers may also be provided in the same or in different subareas.

Depending on the respective requirements, the reinforcing seam may be produced of reinforcing yarns that consist of different materials or material combinations. For example, carbon fibers, glass fibers such as E-glass, synthetic fibers such as polyamide fibers and polyester fibers, metal or aramid fibers, basalt fibers and combinations thereof may be used. The tensile strength of the reinforcing yarns is dependent on the respective requirements with respect to the reinforcement of the support plate, as well as dependent on the material of the reinforcing yarn. One example of a reinforcing yarn is a polyester yarn with a yarn count of 50*2 or 50*3 to 700*2 or 700*3 dtex, wherein 50*2 dtex characterize relatively thin, two-thread yarns and 700*3 dtex characterize relatively thick, three-thread yarns. The yarns may comprise one or more threads, for example up to 10 threads. Another example is a polyamide yarn with a yarn count, for example, of 1000 to 2000 dtex. Another example are glass fiber yarns, particularly E-glass, with a count, for example, of 5.5*1 to 150*4 tex or E-glass with plastic slashing product with a count of 100 to 350 tex, a tensile strength of 100 to 900 MPa and a bending strength of 300 to 1000 MPa. Other examples are reinforcing yarns of carbon fibers that may comprise, for example, approximately 1000-50000 filaments. Another example of reinforcing yarns are endless basalt fibers with a yarn count, for example, of 80, 160 or up to 2500 tex and an average strength of 0.5 N/tex. The reinforcing yarn may consist of several interconnected and/or intertwined fibers or threads. The parallel use of several reinforcing yarns or reinforcing threads is also possible. The reinforcing yarn may consist of a twisted yarn or an endless multifilament yarn.

A local reinforcement of the composite fiber mat can be achieved by means of the reinforcing seam without attaching an additional reinforcing material to the composite fiber mat with the aid of the reinforcing seam. However, it would also be conceivable to locally fasten an additional reinforcing material on the composite fiber mat by means of the reinforcing seam.

The matrix of the composite fiber mat consists, for example, of a thermoplastic or thermosetting polymer or a resin, for example, on the basis of polypropylene, polyamide, polyurethane or acrylic. The fibers may consist of synthetic fibers or natural fibers such as, for example, glass fibers, synthetic fibers, ceramic fibers, basalt fibers, mineral fibers, metal fibers, nylon fibers and other fibers of natural or synthetic polymers such as viscose, rubber, polyester, polyamide, aramide, polyacrylonitrile, polytetrafluoroethylene, polyethylene, polypropylene, polyvinyl chloride and polyurethane. It also would be possible to use nanotube fibers. Among other types, fibers of cotton, kapok, bamboo, hemp, jute, flax, bast, ramie, kenaf, sisal, abaca and coconut may be used as natural fibers without restricting the invention to any certain material or material combination. The composite fiber mat may contain fibers and matrix material in identical or approximately identical proportions or in any other suitable ratio, for example, between 30:70 and 70:30. The composite material may further contain additives such as a binder, softener, dye or odor inhibitor. Combinations of different matrix fiber materials are also possible.

The composite fiber mat may be provided in the form of a fleece material, woven fabric, non-woven fabric, stitch-bonded fabric, knitted fabric or combinations thereof and may be structured as a single-layer or multilayer mat material. In a multilayer composite fiber mat, the fibers in the different layers may also be aligned differently. It is also possible to apply the composite fiber mat onto one or both sides of a honeycomb structure material in order to produce the support plate.

A support plate for a motor vehicle component may comprise a composite fiber mat of the above-described type. The support plate may be three-dimensionally deformed. In this case, the reinforcing seam may lie in the portion of the support plate that is not three-dimensionally deformed or it may lie in the three-dimensionally deformed part of the support plate. In a three-dimensionally deformed support plate, it would be possible, e.g., to arrange the reinforcing seam in such a way that the contour of the reinforcing seam extends at least partially along the contour of the three-dimensional shape. The reinforcing seam can control the deformation of the support plate during the shaping process. A local reinforcing seam can cause a different or reduced deformation of the support plate in the region of the seam because the reinforcing seam more firmly holds together the composite material. Stretching of the composite fiber mat during the forming process hence can be adjusted by means of the reinforcing seam such that the composite fiber mat is stretched to a greater or lesser extent in different regions. In other words, the reinforcing seam can guide or control or at least control stretching of the composite material during the forming process.

In this and other examples, the reinforcing seam can also be arranged in a region of the support plate that is subjected to higher mechanical stresses than other regions of the support plate during the further processing or during the use of the support plate.

The composite fiber mat and the support component can be used in different regions of the motor vehicle such as, for example, as an interior trim part, as a car body part or another exterior part of the motor vehicle or generally as any structural part of the motor vehicle. It can also be used as an acoustically effective trim part that is not necessarily visible to passengers of the motor vehicle such as, for example, as a bulkhead between passenger compartment and engine compartment or as a sound-absorbing engine cover. The support component produced of the composite fiber mat may further form a cargo floor or another component in the floor region of the motor vehicle.

A method for producing a support component for a motor vehicle is proposed, in which a composite fiber mat is furnished and a reinforcing seam is produced in at least a subarea of the composite fiber mat, wherein at least a second subarea of the composite fiber mat is not provided with a reinforcing seam. After the reinforcing seam has been produced, the composite fiber mat is heated and compressed in a pressing tool in order to produce a preform or semifinished product for a subsequent production of the support component. The reinforcing seam is provided in a region of the support component that is subjected to higher mechanical stresses than other regions of the support component during its subsequent processing or its use. During the subsequent processing, the composite fiber mat is in a few examples three-dimensionally deformed, wherein the reinforcing seam can be aligned relative to the three-dimensional shape in such a way that it absorbs and/or distributes the tensions occurring during the deformation and nevertheless allows the required strechting of the mat material during the deformation.

BRIEF DESCRIPTION OF DRAWINGS

Different examples are described in greater detail below with reference to the figures.

FIG. 4 schematically shows a sequence of processing steps for producing a support component with a composite fiber mat according to another example t.

DESCRIPTION OF EXAMPLES

Figure 1:
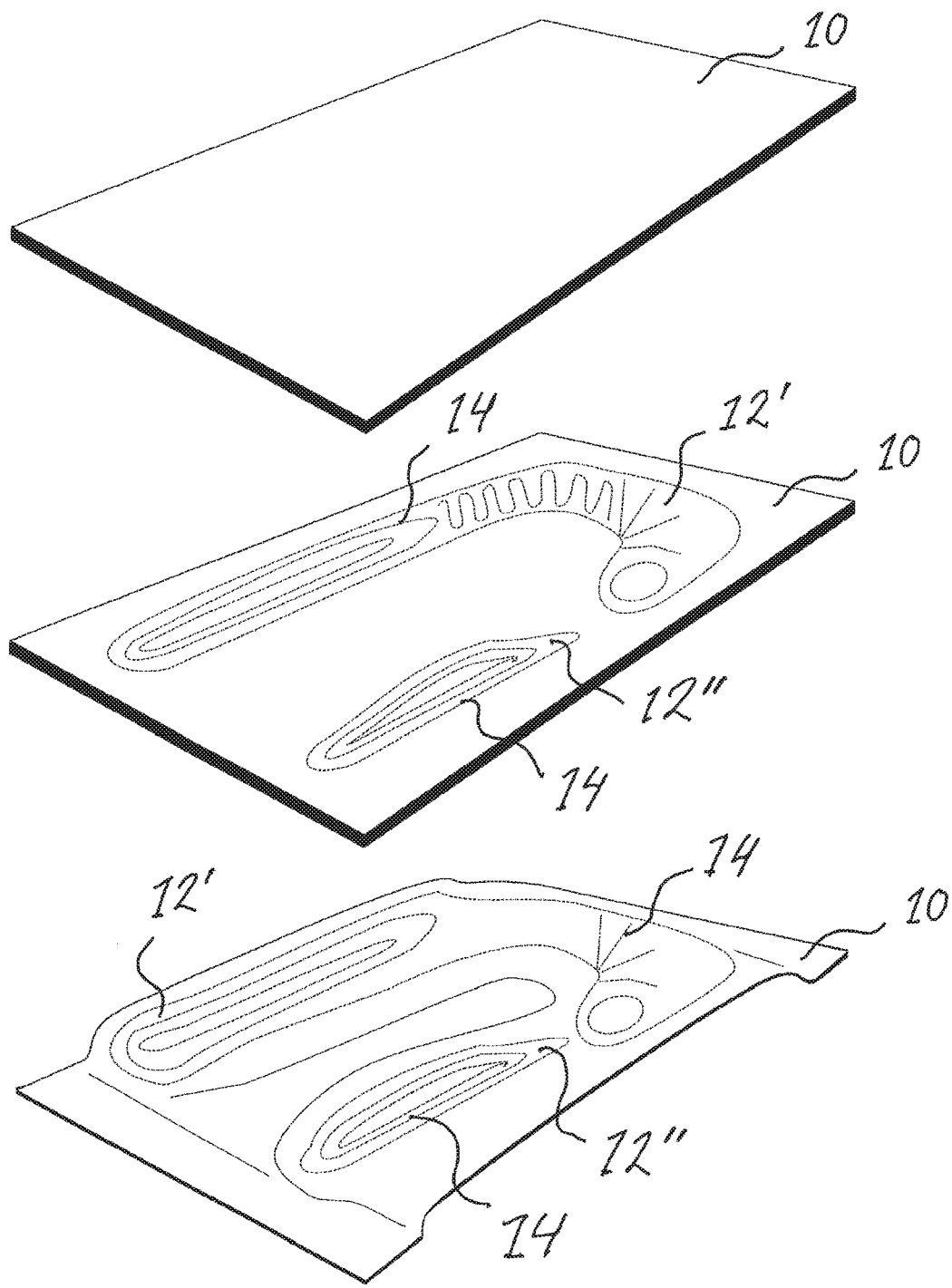
FIG. 1 schematically shows three successive production steps of a composite fiber mat according to an example.

FIG. 1 shows different processing steps of a composite fiber mat according to an example. The composite fiber mat may have the above-described structure. It may consist of a single-layer mat or a multilayer mat. In the example shown, it comprises a polymer or resin matrix and natural fibers, glass fibers or synthetic fibers, but is not restricted to any of these materials. Any of the above-described materials and combinations thereof can be used. In a first processing step (1), the composite fiber mat 10 is cut to size such that its outer contour corresponds or approximately corresponds to the support component to be produced.

In a second processing step (2) of the example shown, the composite fiber mat is provided with reinforcing seams in the region of two subareas 12', 12". In the context of this application, the subareas 12', 12" are also referred to as first subareas, in which the reinforcing seam is provided. The composite fiber mat 10 also comprises other regions or subareas that lie outside the first subareas 12', 12" and are not provided with a reinforcing seam. The first subareas 12', 12" are chosen and arranged in such a way that they reinforce the composite fiber mat 10 at locations, at which particularly high mechanical stresses are expected during the course of the further processing of the mat and during the use of the support component produced thereof, for example due to tensile forces, compressive forces and bending stresses.

The reinforcing seam 14 may be composed of one or more seam sections in each subarea 12', 12", wherein the seam sections may be shaped differently depending on the expected forces applied to the composite fiber mat 10, for example, in the form of one or more loops, circles or other closed ring shapes, in the form of a star, in the form of a sinuous line or a zigzag line or in combinations of these shapes as illustrated in FIG. 1.

For example, a reinforcing yarn that contains or consists of carbon fibers, glass fibers, synthetic fibers, basalt fibers or metal fibers may be chosen for the reinforcing seam 14. Several interconnected and/or intertwined reinforcing threads can be used. It is likewise possible to use any of the above-described materials and their combinations. The stitch width and the seam density can vary within the first subareas 12', 12" depending on the expected stresses of the composite fiber mat. For example, the stitch widths may lie in the range between 0.2 and 5 mm or in the range between 0.5 and 2 or 3 mm. Depending on the respective requirements, several seams or one looped seam may be provided at small intervals of only 1 or 2 mm or even less and at greater intervals of 2 mm to 2 cm, at intervals of 5 cm to 10 cm or even more. Regardless of the stitch width, the reinforcing seam and the composite fiber mat act as a unit after compression processing of the composite fiber mat.

The reinforcing seam may penetrate the composite fiber mat from its upper surface to its bottom surface. It may be produced, for example, by means of an automated sewing machine or a sewing machine with a two-thread system, in which an upper thread and a lower thread are intertwined. For example, two-thread lock stitching machines or chain stitching machines or other sewing machines or automated sewing machines may be used. The reinforcing seam may be produced in the form of a straight line or in the form of a zigzag stitch.

In one example, the reinforcing seam is produced in the first subareas 12', 12" in the form of an embroidery seam. However, it also is possible to sew onto the composite fiber mat 10, in one or more first subareas 12', 12", an additional reinforcing material such as a mat, woven fabric, non-woven fabric, stitch-bonded fabric, knitted fabric, etc., by means of the reinforcing seam 14. This additional reinforcing material is then only provided in one or more first subareas 12', 12", but not over the surface of the entire composite fiber mat.

In the next processing step (3), the composite fiber mat provided with the reinforcing seam 14 is compressed and thereby compacted. This can be realized in one step in a heating press, in which the composite fiber mat is also heated. The composite fiber mat may also be preheated and subsequently compressed with or without additional heating of the mat. During this process, the material of the composite fiber mat may be compressed, for example, to 10-50% of its original density. In a few examples, a composite fiber mat with an initial thickness between 5 and 20 mm or between 6 and 15 mm is during the compression step (3) compressed to a thickness of a few millimeters, for example to 1-5 mm or 1-2 mm or 1.2-2 mm. In an example, the final thickness amounts to approximately 1.5 mm. The composite fiber mat 10 is also three-dimensionally deformed during the compression step as schematically indicated in FIG. 1. The three-dimensional deformation may take place in the region of the first subareas 12' and 12", as well as outside these subareas. In this case, the subareas 12', 12" with the reinforcing seam 14 are arranged in such a way that they reinforce the mat in the region, in which particularly high mechanical stresses are expected during the shaping or during the subsequent use of the composite fiber mat in a motor vehicle.

Subsequently, the preformed composite fiber mat can be trimmed or cut to its final shape in a punching process in order to furnish the preform for the support plate of the motor vehicle component. The punching process may also take place in the pressing tool.

Figure 2:
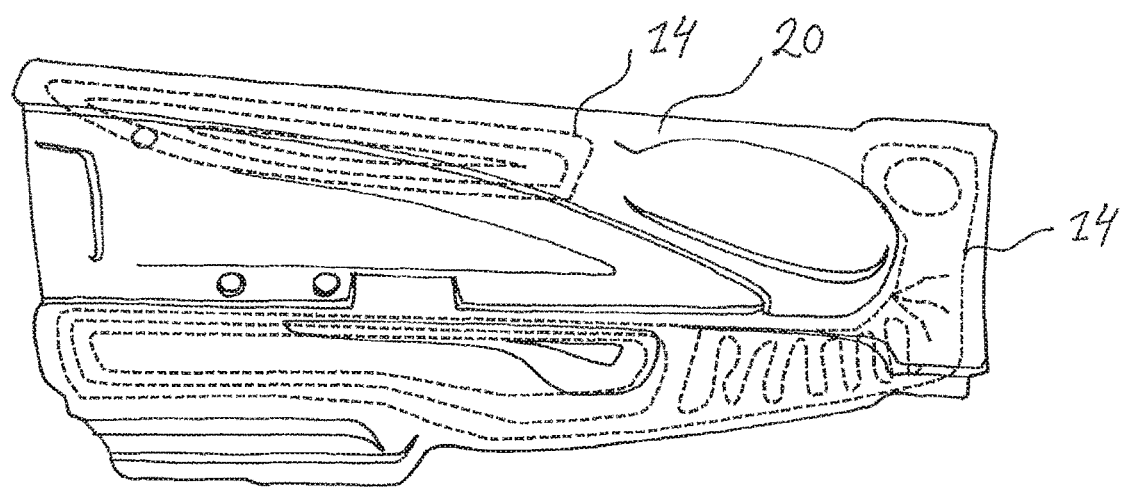
FIG. 2 shows an example of a formed composite fiber mat according to another example.

FIG. 2 shows an example of a composite fiber mat that was formed into a preform 20, wherein reinforcing seams 14 are schematically indicated in this figure. The component illustrated in FIG. 2 is a support component for an interior door panel, which is three-dimensionally deformed in order to produce a curved, three-dimensional geometry in accordance with the design requirements and to thereby provide, e.g., a contour for an armrest or a base for the attachment of a separate armrest, a receptacle for a map pocket, a receptacle or base for the attachment of a door handle or door pull handle or a receptacle for a loudspeaker or other electrical components such as switches or lighting elements.

Reinforcing seams 14 are produced at locations, at which particularly high stresses are expected during the three-dimensional deformation and/or during the use of the support component in the motor vehicle. The reinforcing seam 14 can be produced in the form of several loops or circles, in the form of a sinuous line, in the form of a star and/or along the contour of the subarea to be reinforced as illustrated in FIG. 2. In this case, the reinforcing seam 14 is arranged and aligned in such a way that it allows a desired shaping of the support component and simultaneously counteracts and absorbs peak loads. The reinforcing seam can absorb and/or distribute loads, e.g., upon a side impact as in the example shown, in which an efficient load distribution or absorption is particularly desirable at the H-point (hip point) in order to protect passengers from potentially penetrating sharp-edged objects during the impact. The reinforcing seam can also fulfill this function.

Figure 3:
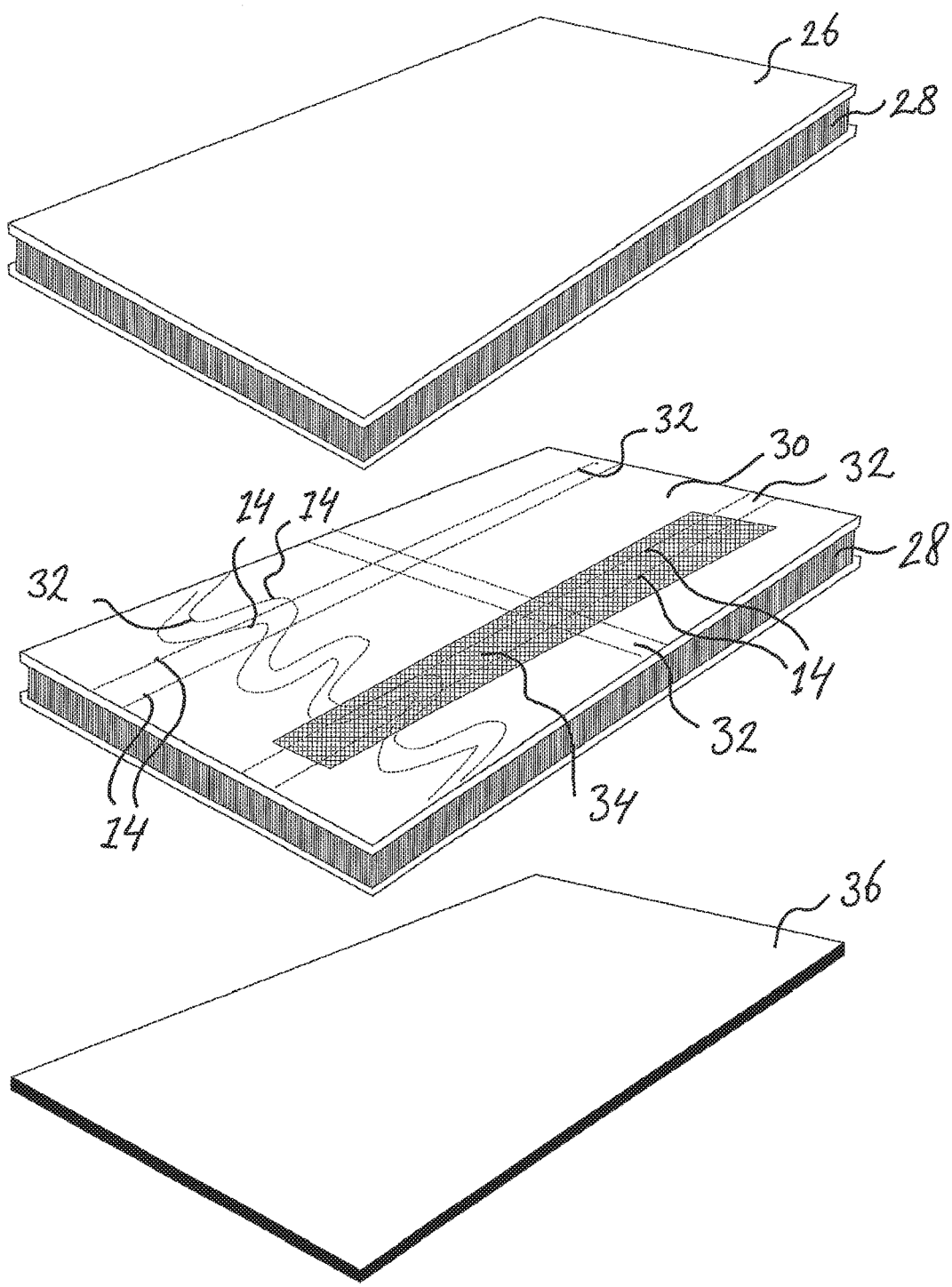
FIG. 3 schematically shows three successive production steps of a support component with a composite fiber mat according to another example.

FIG. 3 shows a sequence of processing steps of a support plate for a motor vehicle comprising a composite fiber mat according to another example. In the example according to FIG. 3, the support plate comprises a honeycomb core 28 with a cover layer 26 consisting of a fleece or a film applied onto one or both surfaces of the core 28. The honeycomb core 28 may have a sandwich structure with two cover layers and different core materials, wherein synthetic and natural materials such as paper can be used, and wherein the honeycombs may be filled with air or foam to cite just a few examples. One more layers of a composite fiber mat 30 can be applied onto the honeycomb core 28 or the cover layer(s) 26, wherein the fibers in a multilayer structure may be aligned differently. As in the preceding example, different synthetic fibers and/or natural fibers may be connected to a polymer or resin matrix, wherein the fibers may comprise, for example, polypropylene, polyethylene, polyamide, polyester, glass fibers, carbon fibers or metal. The composite fiber mat can be produced with different techniques and may comprise formed fabrics, woven fabrics, stitch-bonded fabrics, knitted fabrics and the like. Formed fabrics or fleeces in the form of needle-punched fabrics can be produced, for example, by means of carding or aerodynamically.

The composite fiber mat 30 applied onto the honeycomb core 28 comprises first subareas 32, within which reinforcing seams 14 are produced, wherein said reinforcing seams are schematically illustrated in the form of straight and sinuous seams 14 in the second processing step (2) according to FIG. 3. The reinforcing seams 14 are produced in the subareas 32 at locations, at which particularly high mechanical stresses of the support plate are expected. As in the preceding embodiment, they may contain or consist of carbon fibers, glass fibers, synthetic fibers such as, e.g., polyester fibers, metal fibers or basalt fibers.

The example in FIG. 3 also shows that the reinforcing seam 14 can be used for sewing on an additional reinforcing fabric 34 in a subarea of the composite fiber mat. Other subareas of the composite fiber mat are not provided with an additional reinforcing material.

The structure consisting of the honeycomb core 28, the cover layer 26 and the composite fiber mat 30 illustrated in the processing step (2) according to FIG. 3 can then be compressed and, if applicable, deformed in a subsequent processing step (3). In the example shown, the complete structure is compressed into a flat support plate 36 such that the composite fiber mat and the honeycomb core 28 are compacted and their thickness is reduced. However, it is also possible to three-dimensionally deform the structure illustrated in FIG. 3 during the compression process. Further, the thus formed support plate can be trimmed, punched and optionally laminated.

In the example according to FIG. 3, the composite fiber mat 30 can be bonded to the cover layer 26 of the honeycomb core 28. In this example, the reinforcing seam is only produced in the composite fiber mat, but not in the cover layer 26.

FIG. 4 shows a sequence of processing steps for producing a support plate for a motor vehicle component of a composite fiber mat according to an example. The composite fiber mat may be furnished, for example, in the form of a rolled material as indicated with the reference symbol 38 in FIG. 4. It may contain natural or synthetic fibers and have any of the above-described compositions. The matrix or the composite material may consist of a thermoplastic or thermosetting polymer or a resin as described above. The composite fiber mat may have an initial thickness on the order of 3-20 mm or 5-50 mm or approximately 10 mm. The rolled material 38 is trimmed in a first processing step in order to furnish the mat-shaped composite fiber mat 40. This composite fiber mat 40 is in subareas provided with a reinforcing seam 44 in an automated sewing or embroidery machine 50, wherein the reinforcing seam 44 may be sewn or embroidered, and wherein different sewing/embroidering techniques can be used as described above. It is also possible to sew on an additional reinforcing fabric (that is not illustrated in FIG. 4) in the subarea by means of the reinforcing seam 44. The reinforcing seam may be produced with any of the above-described reinforcing threads or reinforcing yarns.

The composite fiber mat 40 provided with the reinforcing seam 44 is placed into a pressing tool 52, wherein the composite fiber mat 40 is heated before it is placed into the pressing tool 52 and/or in the pressing tool 52. The pressing tool 52 is designed in such a way that it compresses and, if applicable, three-dimensionally deforms the composite fiber mat 40. For this purpose, the pressing tool 52 with the composite fiber mat 40 placed therein is closed and held closed with a predefined pressure for a defined time period, for example about one minute. The composite fiber mat also may be formed to its final shape in the pressing tool 52 by means of punching or pinching.

The pressing tool 52 is then opened such that the preformed and, if applicable, the three-dimensionally shaped and trimmed support plate 46 can be removed. The support plate 46 can subsequently be further processed, for example, by means of laminating, by attaching other components or the like. In contrast to the illustration in FIG. 4, it is also possible to heat and pre-compact the composite fiber mat before it is placed into the pressing tool 52 and to three-dimensionally shape the composite fiber mat subsequently in an additional production step. It further is possible to shape the composite fiber mat with other techniques such as, for example, vacuum forming or back injection-molding. In addition, a cover layer can be laminated onto the composite fiber mat and/or other components can be integrated, for example injection-molded, with the composite fiber mat during its deformation.

If the support plate 46 has an initial thickness on the order of 5-15 mm, it may have a thickness on the order of 1-3 mm or, in particular, 1-2 mm or about 1.5 mm after the deformation or shaping process.

The composite fiber mat can be used for producing a support component for a motor vehicle that is used in the interior or exterior region of the motor vehicle. It is suitable for interior trim parts, as well as for car body parts or other exterior components and for invisible trim parts such as, for example, for sound insulation in the motor vehicle. The support component produced of the composite fiber mat may also be laminated and lined with cover layers of synthetic or natural materials, formed fabrics, carpet, etc. The support plate produced of the composite fiber mat can be used for any structural parts in the motor vehicle. Due to the production of the reinforcing seam, the support plate produced of the composite fiber mat can be locally reinforced, wherein the reinforcement is achieved without a noteworthy increase of the weight or the density of the support plate. The additional weight of the reinforcing seam is negligible. Alternatively, it is possible to produce a motor vehicle component with a comparable strength, but with a smaller thickness than a component consisting of a support plate without reinforcing seam and otherwise identical properties.

If a reinforcing yarn consisting of a thermoplastic elastomer such as, for example, a polypropylene yarn is used, the reinforcing seam may further serve as a base for welding the support component to one or more other plastic components. A reinforcing yarn of thermoplastic material particularly allows to locally increase the proportion of thermoplastic material in the composite fiber mat in order to thereby create a base for welding the composite fiber mat to other plastic parts. If a reinforcing yarn containing metal or consisting of metal is used for the reinforcing seam, the reinforcing seam can simultaneously fulfill the function of an electrical conductor in the motor vehicle, for example, in order to drive a light source or a regulating device. In this case, the reinforcing seam can transmit signals, as well as electrical energy. It would also be conceivable to use a reinforcing yarn in the form of an electrical inductor with an insulating sheath for this purpose.

What is claimed is:

1. A composite fiber mat to form a support plate of a motor vehicle component, comprising:
    an upper surface and a bottom surface; and
    at least a first subarea of the composite fiber mat is provided with at least one reinforcing seam;
    wherein the reinforcing seam penetrates the composite fiber mat from the upper surface to the bottom surface;
    wherein the composite fiber mat is a compression deformable composite fiber mat which comprises fibers disposed in a matrix resin, wherein the fibers comprise natural fibers, synthetic fibers, glass fibers, carbon fibers or a combination thereof;
    wherein at least a second subarea of the composite fiber mat is not provided with a reinforcing seam;
    wherein the composite fiber mat is deformable from a planar form into a form having a three-dimensional shape; and
    wherein the at least one seam is arranged to allow deformation of the composite fiber mat from the planar form into the three-dimensional shape form while counteracting and/or absorbing loads encountered by the composite fiber mat arising from the deformation.

2. The composite fiber mat according to claim 1, wherein the reinforcing seam borders, fills and/or traverses the at least one subarea.

3. The composite fiber mat according to claim 1, wherein the reinforcing seam is produced in the form of one or more loops, circles or other closed ring shapes, in the form of open or closed polygons, in the form of a star, in the form of a sinuous line or a zigzag line or in a combination of these shapes.

4. The composite fiber mat according to claim 1, wherein the reinforcing seam is produced of a reinforcing yarn that comprises carbon fibers, glass fibers, E-glass, synthetic fibers such as polyamide fibers or polyester fibers, basalt fibers, metal, aramide or a combination thereof.

5. The composite fiber mat according to claim 1, wherein the reinforcing seam is produced of a reinforcing yarn that contains a thermoplastic elastomer in order to locally increase the elastomer content of the composite fiber mat.

6. The composite fiber mat according to claim 1, wherein the reinforcing seam is produced of an electrically conductive reinforcing yarn.

7. The composite fiber mat according to claim 1, wherein no additional reinforcing material is attached to the composite fiber mat by means of the reinforcing seam.

8. The composite fiber mat according to claim 1, wherein an additional reinforcing material is fastened on the composite fiber mat by means of the reinforcing seam.

9. The composite fiber mat according to claim 1, wherein the composite fiber mat comprises a mixture of natural fibers and synthetic fiber.

10. The composite fiber mat according to claim 1, wherein the composite fiber mat comprises a fleece material, a formed fabric, a woven fabric, a non-woven fabric, a stitch-bonded fabric, a knitted fabric, a multilayer mat material or combinations thereof.

11. The composite fiber mat according to claim 1, wherein the composite fiber mat is applied onto a honeycomb structure material.

12. A support plate of a motor vehicle component comprising:
    a composite fiber mat;
    wherein at least a first subarea of the composite fiber mat is provided with at least one reinforcing seam, and wherein at least a second subarea of the composite fiber mat is not provided with a reinforcing seam;
    wherein the composite fiber mat is a compression deformed composite fiber mat which comprises fibers disposed in a matrix resin, wherein the fibers comprise natural fibers, synthetic fibers, glass fibers, carbon fibers or a combination thereof; and
    wherein the support plate is one of
        three-dimensionally shaped in the region of the first subarea, in which the reinforcing seam is provided, when the support plate forms part of the motor vehicle component; and
        three-dimensionally shaped, and the first subarea, in which the reinforcing seam is provided, has a contour that at least partially extends along the contour of the three-dimensional shape when the support plate forms part of the motor vehicle component; and
    wherein, in response to a localized stress applied to an area of the support plate, the at least one seam acts to distribute the localized stress to a larger area of the support plate.

13. The support plate according to claim 12, which is part of an interior trim part, a car body part, an acoustically effective trim part or another structural part of the motor vehicle.

14. A composite fiber mat, comprising:
    an upper surface, a bottom surface and an area; and
    at least one reinforcing seam, wherein the at least one reinforcing seam is disposed only in a subarea of the composite fiber mat, the subarea of the composite mat being a localized area of the composite fiber mat less than the area of the composite fiber mat;
    wherein the reinforcing seam penetrates the composite fiber mat from the upper surface of the mat to the bottom surface of the mat, and is disposed only in the mat; and
    wherein the composite fiber mat is a compression deformable composite fiber mat which comprises fibers disposed in a matrix resin, wherein the fibers comprise natural fibers, synthetic fibers, glass fibers, carbon fibers or a combination thereof.

* * * * *